United States Patent
Kim

(10) Patent No.: US 9,862,782 B2
(45) Date of Patent: Jan. 9, 2018

(54) APPARATUS FOR SEPARATING SOLVENT OF SOLUTION POLYMERIZATION PROCESS USING METALLOCENE CATALYSTS AND THE METHOD THEREOF

(71) Applicant: C&CPEL CO., LTD., Daejeon (KR)

(72) Inventor: Yangkee Kim, Daejeon (KR)

(73) Assignee: C&CPEL CO., LTD., Daejeon (KR)

( * ) Notice: Subject to any disclaimer, the term of this patent is extended or adjusted under 35 U.S.C. 154(b) by 0 days.

(21) Appl. No.: 15/310,923

(22) PCT Filed: Jun. 8, 2015

(86) PCT No.: PCT/KR2015/005710
§ 371 (c)(1),
(2) Date: Nov. 14, 2016

(87) PCT Pub. No.: WO2016/114454
PCT Pub. Date: Jul. 21, 2016

(65) Prior Publication Data
US 2017/0081433 A1    Mar. 23, 2017

(30) Foreign Application Priority Data
Jan. 16, 2015   (KR) ......................... 10-2015-0007771

(51) Int. Cl.
*C08F 210/00* (2006.01)
*B01J 19/00* (2006.01)
(Continued)

(52) U.S. Cl.
CPC ................ *C08F 6/10* (2013.01); *C08F 2/06* (2013.01); *C08F 6/003* (2013.01); *C08F 6/12* (2013.01); *C08F 10/00* (2013.01)

(58) Field of Classification Search
CPC .... C08F 6/003; C08F 6/12; C08F 2/06; C08F 10/00; C08F 6/10; C08L 23/00
(Continued)

(56) References Cited

U.S. PATENT DOCUMENTS 6,660,236 B1 * 12/2003 Kodama .................. C08J 11/14
422/187

FOREIGN PATENT DOCUMENTS

JP      2009-502819        1/2009
KR      10-0520588        10/2005

OTHER PUBLICATIONS

International Search Report for PCT/KR2015/005710, dated Jul. 6, 2015 (English Translation).

* cited by examiner

*Primary Examiner* — William Cheung
(74) *Attorney, Agent, or Firm* — STIP Law Group, LLC

(57) ABSTRACT

This invention relates to an apparatus and method for separating a solvent in a metallocene catalyst-based solution polymerization process for preparing a polyolefin, suitable for use in removing a solvent from a reaction mixture resulting from a polymerization step during a solution polymerization process for preparing a polyolefin polymer using a metallocene catalyst, wherein volatile matter including a solvent and an unreacted monomer is primarily removed from the reaction mixture using a flash drum, after which residual volatile matter including the solvent, which is left behind in the reaction mixture after the primary removal process, is secondarily removed in a high vacuum using a thin-film evaporator. The polymer thus obtained has a volatile matter content of 100 ppm or less and is thus an environmentally friendly product.

4 Claims, 1 Drawing Sheet

(51) Int. Cl.
*C08F 6/10* (2006.01)
*C08F 10/00* (2006.01)
*C08F 2/06* (2006.01)
*C08F 6/00* (2006.01)
*C08F 6/12* (2006.01)

(58) Field of Classification Search
USPC .......................................... 526/348; 422/131
See application file for complete search history.

US 9,862,782 B2

APPARATUS FOR SEPARATING SOLVENT OF SOLUTION POLYMERIZATION PROCESS USING METALLOCENE CATALYSTS AND THE METHOD THEREOF

CROSS-REFERENCE TO RELATED APPLICATIONS

This application is the U.S. National Phase under 35 U.S.C. §371 of International Application No. PCT/KR2015/005710 filed on Jun. 18, 2015, which in turn claims the benefit of Korean Application No. 10-2015-0007771, filed on Jan. 16, 2015, the disclosures of which are incorporated by reference into the present application.

TECHNICAL FIELD

The present invention relates to an apparatus and method for separating a solvent in a metallocene catalyst-based solution polymerization process for preparing a polyolefin and, more particularly, to an apparatus and method for separating a solvent and a polymer from each other in a polymer solution resulting from the polymerization step in the solution polymerization process for preparing a polyolefin polymer using a metallocene catalyst.

BACKGROUND ART

A solution polymerization process for preparing a polyolefin using a metallocene catalyst, which corresponds to the technical field of the present invention, is typically a process of synthesizing a homogeneous polymer from a mixture comprising a solvent and at least one monomer selected from among alpha-olefins, such as ethylene, propylene, butene, hexene, octene and so on, in the presence of a metallocene catalyst. For reference, a metallocene catalyst is an organometallic compound configured to variously bind a transition metal (Ti, Zr, Hf, V, Nb, Ta, Cr, Mo, W, etc.) and a ligand derivative, having the basic structure of a cyclopentadiene, as disclosed in a variety of documents and patents, or any chemical structure that is an extension of the cyclopentadiene basic structure.

A typical metallocene catalyst-based solution polymerization process for preparing a polyolefin is a process in which a monomer, a solvent, a metallocene catalyst and so on are reacted with stirring in a polymerization reactor to afford a reaction product, which is then concentrated and solidified, resulting in a polymer.

During the solution polymerization process, the monomer is consumed, and the polymer, resulting from polymerizing the monomer, is dissolved in the solvent. As the concentration of the polymer increases, that is, as the polymerization progresses, the viscosity of the reaction mixture comprising the polymer, the unreacted monomer and the solvent is increased.

The reaction mixture is transferred from the polymerization reactor into a post-treatment device. The post-treatment device is used to separate volatile matter including the unreacted monomer and the solvent from the polymer of the reaction mixture. The removal of volatile matter is one of the final processing steps in the production of various polymers.

In the post-treatment device, the unreacted monomer and the solvent are gradually removed from the reaction mixture until the polymer obtained through the polymerization step is formed into a pellet or a bale. Here, the unreacted monomer and the solvent, which are separated, may be recirculated back to the polymerization reactor.

To remove volatile matter using the post-treatment device, a variety of methods of removing volatile matter from the reaction mixture depending on the viscosity of the reaction mixture are known, and may include heating a polymer solution to a temperature higher than the evaporation temperature of the volatile matter using a heat exchanger, or evaporating volatile matter from the high-temperature high-pressure reaction mixture in a vacuum or at low pressure.

Conventionally useful post-treatment processing is performed in a manner in which one or two flash drums are connected so that the solvent is sequentially removed from the reaction mixture. More specifically, the polymer solution resulting from the polymerization step is heated to a high temperature using a heat exchanger under predetermined pressure, placed in flash drums so that the solution is primarily volatilized at a low pressure to afford a dense polymer solution, from which the solvent is then secondarily volatilized at a lower pressure to yield a denser high-viscosity solution, which is then transferred into an extruder via a gear pump so that residual volatile matter is finally removed in a high vacuum, followed by a pelletizing step.

Alternatively, primary and secondary flash drum processes are omitted, and the solution may be treated using a single drum and then transferred into an extruder using a gear pump or gravity.

The case where the solution is transferred using gravity may be problematic because it is difficult to transport a high-molecular-weight polymer product, or a polymer having a specific molecular weight cannot be transported when the concentration thereof decreases below a predetermined level.

The present invention is undertaken to propose a technique for a novel polymer separation apparatus for producing a polymer product in which the amount of residual volatile matter is lower even without the use of a long extruder, which typically operates in a high vacuum, and for solving problems with the conventional art.

The related art to which the present invention belongs is briefly described below, and the technical features of the present invention different from those of the related art are also described.

Korean Patent No. 0769774 (Oct. 17, 2007) discloses a continuous solution polymerization method and apparatus, the apparatus comprising a pressure supply source, a polymerization reactor disposed downstream of the pressure supply source, a pressure-dropping device disposed downstream of the polymerization reactor, and a separator disposed downstream of the pressure-dropping device, wherein the pressure supply source functions to apply pressure to the reaction mixture during the operation of the processing apparatus, whereby a single-phase liquid reaction mixture is produced in the reactor and a two-phase liquid-liquid reaction mixture is produced in the separator, even without the use of an additional pressure supply source between the reactor and the separator.

European Patent No. 226204 (Mar. 3, 1993) discloses a process for removing volatile matter from a polymer solution containing 25 wt % or more of a polymer and a heat exchanger therefor, wherein the polymer solution is heated in an indirect heat-exchange zone comprising a plurality of channels. Here, the channels have a substantially consistent surface-area-to-volume ratio of 0.158 to 1.97 $mm^{-1}$, a height of 1.27 to 12.7 mm, a width of 2.54 to 10.16 cm and a length of 1.27 to 30.48 cm, and the polymer solution is heated to a temperature that is higher than the evaporation temperature of volatile matter but is lower than the boiling temperature of the polymer at a pressure ranging from 2 to 200 bar within the channels, after which the solution from which 25% or more of volatile matter has been stripped is placed in a chamber. This process is advantageous because the time during which the polymer is exposed to the increased temperature is decreased, thus reducing thermal damage, but is disadvantageous because the solvent cannot be completely removed through a single step, and polymer deposits are formed outside a bundle of heat exchange tubes and may be carbonized over time, or may sometimes peel off in flakes, undesirably contaminating the solvent-free polymer.

Also, European Patent Application Publication No. 352727 (Jan. 5, 1994) discloses a method of removing volatile matter from a polymer solution by heating the polymer solution to a temperature higher than the evaporation temperature of volatile matter via a plurality of channels that are connected in parallel. More specifically, the ratio of the heat exchange surface area to the volumetric flow rate of the product is about 80 $m^2/m^3/h$, the flow rate in the channels is about 0.5 mm/s, and the residence time of the polymer solution in the channels ranges from 120 to 200 sec. This process is problematic because the solvent cannot be completely removed through a single step, and polymer deposits are formed outside a bundle of heat exchange tubes and may be carbonized over time, or may sometimes peel off in flakes, undesirably contaminating the solvent-free polymer.

Such related documents are somewhat similar to the present invention in that a solution polymerization process is employed to prepare a polyolefin using a metallocene catalyst, but are distinguished from the present invention because the effective separation of a polymer using the combination of a flash drum and a thin-film evaporator, corresponding to the gist of the present invention, is not found in the related documents.

DISCLOSURE

Technical Problem

Accordingly, the present invention has been made keeping in mind the above problems encountered in the related art, and the present invention is intended to provide a novel solvent separation apparatus and method, wherein, in the solution polymerization process for preparing a polyolefin using a metallocene catalyst, the solvent may be effectively separated from the polymer solution resulting from the polymerization step using at least one flash drum and at least one thin-film evaporator, thus suppressing the generation of gel and producing a polymer product, the amount of residual volatile matter of which is 100 ppm or less, preferably 50 ppm or less, and more preferably 10 ppm or less.

Technical Solution

An embodiment of the present invention provides an apparatus for removing a solvent from a reaction mixture resulting from a polymerization step in a solution polymerization process for preparing a polyolefin polymer using a metallocene catalyst, comprising: a polymerization reactor for preparing a polyolefin polymer from a mixture comprising a hydrocarbon solvent and an olefin monomer; a flash drum for concentrating a reaction mixture obtained in the polymerization reactor in a manner in which the reaction mixture is transferred into the drum in a vacuum or at a pressure lower than the pressure of the reaction mixture from the polymerization reactor so that volatile matter including a solvent and an unreacted monomer is evaporated from the reaction mixture; and a thin-film evaporator for separating the reaction mixture into a dilute phase and a concentrated phase in a manner in which the reaction mixture is heated while flowing in the form of a thin film along the heat transfer surface of the evaporator so that the volatile matter including the solvent and the unreacted monomer is evaporated from the reaction mixture, wherein the thin-film evaporator is disposed downstream of the flash drum and thus receives the reaction mixture, from which the volatile matter including the solvent and the unreacted monomer is primarily evaporated and which is concentrated, from the flash drum, so as to secondarily evaporate the volatile matter including the solvent and the unreacted monomer. Here, the flash drum may include one or more flash drums, and the thin-film evaporator may include one or more thin-film evaporators, which are connected in multiple stages.

As such, the thin-film evaporator may be either a falling flow-type thin-film evaporator or a forced thin-film evaporator for forcible wiper scraping. Preferably useful is a forced thin-film evaporator.

Here, transferring the polymer solution into the flash drum and the thin-film evaporator may be performed using a pressure difference and gravity, or via a gear pump.

Also, the dilute phase including the solvent and the unreacted monomer, obtained from the flash drum and the thin-film evaporator, may be recirculated back to the polymerization reactor for preparing a polymer.

The concentrated phase obtained from the thin-film evaporator may be transferred in order to carry out a pelletizing step via a gear pump or an extruder.

Another embodiment of the present invention provides a method of removing a solvent from a reaction mixture resulting from a polymerization step in a solution polymerization process for preparing a polyolefin polymer using a metallocene catalyst, comprising: primarily separating a high-temperature high-pressure reaction mixture into a dilute phase and a concentrated phase by transferring the reaction mixture into a flash drum in a vacuum or at a pressure lower than the pressure of the high-pressure reaction mixture so that volatile matter including a solvent and an unreacted monomer is evaporated from the reaction mixture; and secondarily separating the reaction mixture into a dilute phase and a concentrated phase by evaporating the volatile matter including the solvent and the unreacted monomer from the concentrated phase obtained in the primarily separating using a thin-film evaporator.

Also, the method of the invention may further comprise transferring a polymer melt, which is obtained in the secondarily separating and from which the volatile matter including the solvent and the unreacted monomer is removed, so as to carry out a pelletizing step using a gear pump or an extruder.

Also, the method of the invention may further comprise recirculating the dilute phase including the solvent and the unreacted monomer, obtained from the flash drum and the thin-film evaporator, back to the polymerization reactor for preparing a polymer.

In the primarily separating, the concentration of the solvent in the reaction mixture is set to the range of 1 to 80 wt %, preferably 5 to 30 wt %, and more preferably 10 to 20 wt %.

Advantageous Effects

The present invention pertains to an apparatus and method for separating a solvent in a metallocene catalyst-based solution polymerization process for preparing a polyolefin, suitable for use in removing a solvent from a reaction mixture resulting from a polymerization step during the solution polymerization process for preparing a polyolefin polymer using a metallocene catalyst. Specifically, volatile matter including a solvent and an unreacted monomer is primarily removed from the reaction mixture using a flash drum, and then residual volatile matter, which is left behind in the reaction mixture after the primary removal process, is secondarily removed in a high vacuum using a thin-film evaporator, after which the resulting polymer melt, from which the residual volatile matter has been removed, is transferred in order to carry out a pelletizing step via a gear pump or an extruder, thereby effectively producing a polymer product containing a lower amount of residual volatile matter even without the use of a typical long extruder that operates in a high vacuum. Moreover, the apparatus of the present invention is effective at suppressing the generation of gel and producing an environmentally friendly polymer product having a volatile matter content of 100 ppm or less, preferably 50 ppm or less, and more preferably 10 ppm or less.

BEST MODE

Hereinafter, a detailed description will be given of an apparatus and method for separating a solvent in a metallocene catalyst-based solution polymerization process for preparing a polyolefin according to embodiments of the present invention, with reference to the accompanying drawings.

As defined hereinbefore, the present invention addresses an apparatus and method for separating volatile matter including a solvent and the like in a metallocene catalyst-based solution polymerization process for preparing a polyolefin. The polymer produced using a metallocene catalyst has a density lower than that of a polymer produced using a Ziegler-Natta catalyst. For example, when polyethylene is produced using a Ziegler-Natta catalyst, it has a density of 0.920 to 0960 $g/cm^3$, and the use of a metallocene catalyst enables the preparation of a polymer resin having a density lower than 0.920 $g/cm^3$, and preferably a density of 0.860 to 0.900 $g/cm^3$, which is a low density range that cannot be achieved using a Ziegler-Natta catalyst. When the density of the produced polymer is decreased in this way, the crystallinity thereof is also lowered, thus remarkably increasing transparency and decreasing the melt temperature of the produced polymer due to an increase in the amount of amorphous component.

In this way, when the density of the produced polymer is low, the likelihood of the polymer degrading may considerably increase. In the case where heat treatment is not controlled in the post-treatment processing for removing volatile matter from the polymer solution, or where there occurs a difference in residence time in the heat exchanger, the generation of a typical gel or a very small micro-gel is drastically increased. When a film is manufactured using a polymer containing such a gel, the quality or grade of the film may remarkably decrease. Hence, control of the formation of gel in the polymer solution in the presence of a metallocene catalyst is regarded as very important.

When using a metallocene catalyst, in contrast to when using a Ziegler-Natta catalyst, post heat treatment has to be carefully controlled.

The present invention addresses a solvent separation apparatus that prevents the generation of gel during post heat treatment based on the properties of a polymer prepared using a metallocene catalyst, which is different from a polymer obtained using a Ziegler-Natta catalyst.

Figure 1:
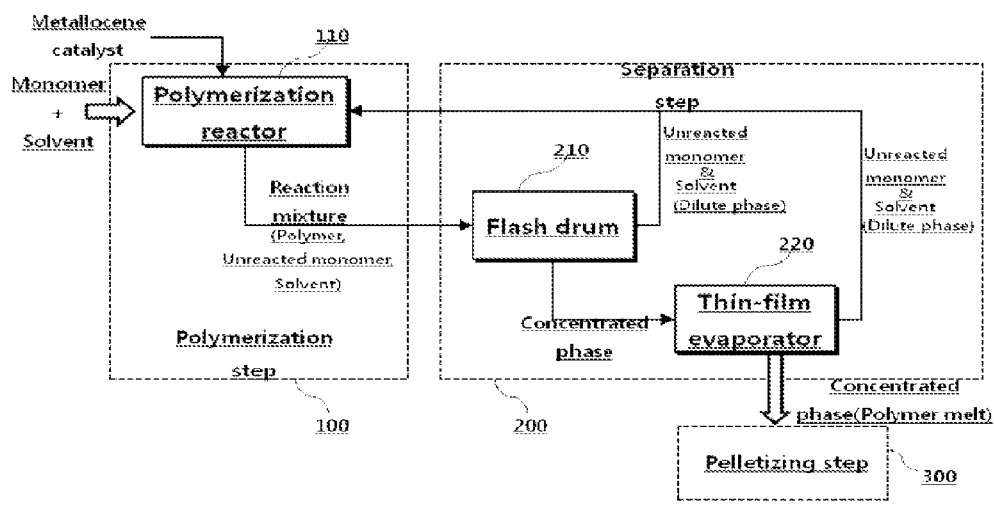
FIG. 1 is a block diagram showing the schematic flow of a metallocene catalyst-based solution polymerization process.

FIG. 1 is a block diagram showing the schematic flow of a metallocene catalyst-based solution polymerization process for preparing a polyolefin. The metallocene catalyst-based solution polymerization process for preparing a polyolefin typically includes the steps of polymerization, separation, and pelletizing, resulting in a polymer product. Conventionally, during the separation step, after the polymerization step, the polymer solution is heated to a high temperature using a heat exchanger under predetermined pressure, placed in a flash drum at a pressure lower than that of the polymer solution to primarily produce a dense polymer solution from which volatile matter is partially removed, followed by secondary removal of the volatile matter at a pressure lower than the primary processing, thus obtaining a denser high-viscosity solution, which is then transferred into an extruder using gravity and a pressure difference or a gear pump, whereby the residual volatile matter is finally removed in a high vacuum, followed by a pelletizing step. Alternatively, only one drum is used, in lieu of primary and secondary flash drums, after which the solution is transferred into an extruder using a gear pump or gravity.

Figure 2:
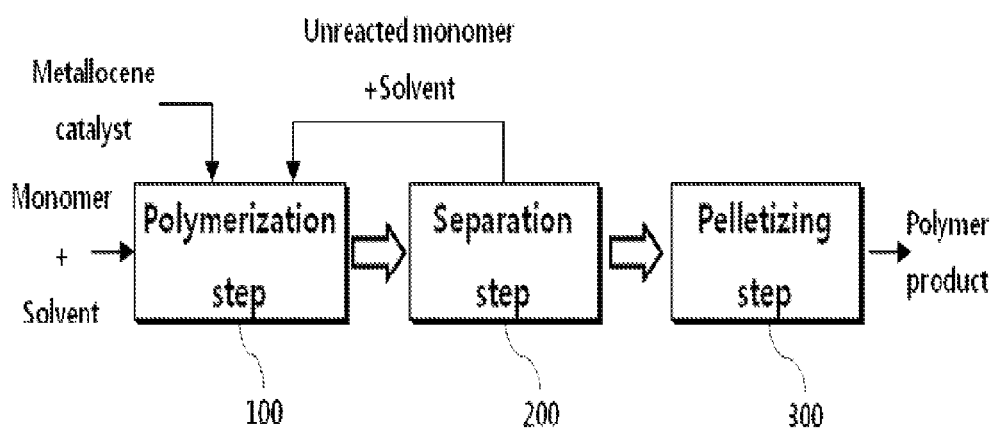
FIG. 2 is a block diagram showing a metallocene catalyst-based solution polymerization process for preparing a polyolefin according to an embodiment of the present invention.

FIG. 2 shows a metallocene catalyst-based solution polymerization process for preparing a polyolefin according to an embodiment of the present invention.

As shown in FIG. 2, the metallocene catalyst-based solution polymerization process for preparing a polyolefin according to the present invention is performed in a manner in which a monomer and a solvent are fed into a polymerization reactor, a metallocene catalyst is added thereto to induce a polymerization reaction, and the reaction mixture obtained from the polymerization reactor is transferred to carry out a separation step. In the separation step, the volatile matter including the unreacted monomer and the solvent may be removed two times from the reaction mixture using a flash drum and a thin-film evaporator. As necessary, the flash drum and/or the thin-film evaporator may be configured such that one or more flash drums and/or one or more thin-film evaporators may be connected in one or more stages.

The solvent used in the metallocene catalyst-based solution polymerization process for preparing a polyolefin is a hydrocarbon solvent, the selection of which is not particularly limited, and a blend of a plurality of solvents may be used. Non-limiting examples of the hydrocarbon solvent may include aromatic and Freon series, including paraffin, such as hexane, cyclohexane, heptane, octane and dodecane, isoparaffin, benzene, 1,3,5-trimethylbenzene, toluene, etc., and halogenated hydrocarbon, such as chlorobenzene, dichlorobenzene, and trichlorobenzene.

More specifically, the polymerization step is carried out to produce a polyolefin polymer using a metallocene catalyst in a manner in which a mixture comprising a monomer and a solvent is fed together with a metallocene catalyst into a polymerization reactor, after which the inner pressure of the polymerization reactor is increased to a predetermined level or more using a pressure supply device so that a polymerization reaction takes place. When the inner pressure of the polymerization reactor is increased in this way, the reaction mixture may be prevented from being separated into two phases during the polymerization under polymerization conditions in a wide temperature range.

The temperature appropriate for the polymerization reaction in the polymerization reactor is set within the range of 70 to 250° C., and preferably 130 to 210° C. As such, the pressure of the polymerization reactor is set to the range of 30 to 150 bar, and preferably 50 to 110 bar. If the temperature and the pressure fall out of the above ranges, a two-phase reaction mixture is not formed during the polymerization. Hence, when the temperature and the pressure for polymerization fall within the above ranges, the polymerization efficiency may be increased during the polymerization step.

The mixture comprising the monomer and the solvent is subjected to the polymerization step to yield a reaction mixture comprising a polymer, the unreacted monomer and the solvent.

The reaction mixture comprising the polymer, the unreacted monomer and the solvent is a polymer solution obtained after the polymerization step. The polymer thus obtained has a concentration of 5 to 40 wt %, and preferably 10 to 30 wt %. If the concentration thereof falls out of the above range, it is difficult to transfer the reaction mixture resulting from the polymerization step in order to carry out the subsequent step.

After the termination of the polymerization step, the reaction mixture is transferred to conduct the separation step by means of the pressure that is applied to the polymerization reactor using a pressure supply device.

The separation step is performed to separate volatile matter, including the unreacted monomer and the solvent, from the reaction mixture transferred from the polymerization reactor, thereby obtaining a polymer melt in which the amount of residual volatile matter is equal to or less than a predetermined level. The volatile matter is removed through primary treatment using the flash drum and is then completely or almost completely removed through secondary treatment using the thin-film evaporator.

Through primary treatment in the separation step using the flash drum, the volatile matter is removed, so that the amount of volatile matter including the solvent and the unreacted monomer in the reaction mixture ranges from 1 to 80 wt %, preferably 5 to 30 wt %, and more preferably 10 to 20 wt %. Thereafter, the unreacted monomer and the solvent that have been left behind in the reaction mixture are secondarily removed using the thin-film evaporator.

The temperature of the flash drum in the separation step falls in the range of 100 to 250° C., and preferably 150 to 230° C. in order to achieve high separation efficiency.

The pressure of the flash drum is set to the range of 1 to 40 bar, and preferably 3 to 15 bar in order to achieve high separation efficiency.

If the temperature and pressure thereof fall out of the above ranges, the extent of removal of the solvent is low. Hence, the separation step is preferably carried out within the above temperature and pressure ranges.

The flash drum allows the inside of the drum to be adjusted to a low pressure or vacuumized using a pressure-dropping device. When the high-temperature high-pressure reaction mixture is fed into the flash drum from the polymerization reactor, the reaction mixture is separated into a dilute phase and a concentrated phase while the volatile matter from the reaction mixture is evaporated through flash evaporation.

For reference, flash evaporation is instant evaporation. Once a high-temperature high-pressure liquid is placed in a low-pressure vessel, vapor is instantly generated while the temperature of the liquid is lowered to the saturation temperature at that pressure.

In the present invention, the separation step includes primary separation using the flash drum and secondary removal of volatile matter by feeding the reaction mixture in a concentrated phase, from which volatile matter has been primarily removed using the flash drum, into the thin-film evaporator.

The reaction mixture fed into the thin-film evaporator is heated while flowing along the heat transfer surface of the thin-film evaporator, whereby the unreacted monomer and the solvent, which were not removed in the primary separation process, evaporate and the reaction mixture is further separated into a dilute phase and a concentrated phase.

The temperature of the thin-film evaporator falls in the range of 150 to 280° C., and preferably 180 to 240° C. As such, the pressure of the thin-film evaporator falls in the range of $1.3 \times 10^{-5}$ to 1.01 bar (0.01 to 760 Torr), and preferably $1.3 \times 10^{-4}$ to 0.53 bar (0.1 to 400 Torr). If the temperature and pressure thereof fall out of the above ranges, it is difficult to separate the reaction mixture into a dilute phase and a concentrated phase. Hence, the temperature and pressure thereof have to be set within the above ranges.

The dilute phase evaporated from the flash drum and the thin-film evaporator, namely the unreacted monomer and the solvent, may be converted into a liquid, which is then recirculated back to the polymerization reactor and thus recycled.

Also, the polymer melt, from which residual volatile matter including the solvent and the like has been removed through two separation procedures, is subjected to a pelletizing step using a gear pump or an extruder, and is then transferred into a silo.

The polymer separation apparatus according to the present invention enables the production of a polymer product having a volatile matter content of 100 ppm or less, preferably 50 ppm or less, and more preferably 10 ppm or less through the aforementioned steps, and the product, having low volatile matter content, may be useful as an environmentally friendly product.

Also, the polymer separation apparatus according to the present invention enables the volatile matter (which is in a dilute phase including the unreacted monomer and the solvent) separated during the production of a polymer product having low volatile matter content to be recycled in the polymerization reaction, thereby increasing production efficiency.

Although the preferred embodiments of the present invention have been disclosed for illustrative purposes with reference to the accompanying drawings, those skilled in the art will appreciate that various modifications and equivalents are possible, without departing from the scope and spirit of the invention as disclosed in the accompanying claims. Therefore, the scope of the present invention should be determined by the accompanying claims.

INDUSTRIAL APPLICABILITY

The present invention pertains to an apparatus and method for separating a solvent and a polymer from each other in a polymer solution resulting from a polymerization step in a solution polymerization process for preparing a polyolefin polymer using a metallocene catalyst.

The invention claimed is:

1. A method of separating a solvent, suitable for use in removing volatile matter including a solvent and an unreacted monomer from a reaction mixture resulting from a polymerization step in a solution polymerization process for preparing a polyolefin polymer using a metallocene catalyst, the method comprising:

polymerizing a mixture comprising a hydrocarbon solvent and an olefin monomer, thus obtaining a high-temperature high-pressure reaction mixture;

primarily separating the high-temperature high-pressure reaction mixture into a dilute phase and a concentrated phase by transferring the reaction mixture into a flash drum in a vacuum or at a pressure lower than a pressure of the high-pressure reaction mixture so that the volatile matter including the solvent and the unreacted monomer is evaporated from the reaction mixture; and secondarily separating the reaction mixture into a dilute phase and a concentrated phase by evaporating the volatile matter including the solvent and the unreacted monomer from the concentrated phase obtained in the primarily separating using a thin-film evaporator.

2. The method of claim 1, wherein the polymerizing is performed at 70 to 250° C. and 30 to 150 bar, the primarily separating is performed at 100 to 250° C. and 1 to 40 bar, the secondarily separating is performed at 150 to 280° C. and $1.3 \times 10^{-5}$ to 1.01 bar, and a pressure of the primarily separating is lower than that of the polymerizing.

3. The method of claim 1, further comprising recirculating the dilute phase including the solvent and the unreacted monomer obtained from the flash drum and the thin-film evaporator back to the reaction mixture for preparing a polymer.

4. The method of claim 1, wherein, after the primarily separating, the volatile matter including the solvent and the unreacted monomer in the reaction mixture has a concentration of 1 to 80 wt %, and, after the secondarily separating, the volatile matter including the solvent and the unreacted monomer in the reaction mixture has a concentration of 100 ppm or less.

* * * * *